(12) United States Patent
McDermott, Jr. et al.

(10) Patent No.: US 6,301,534 B1
(45) Date of Patent: Oct. 9, 2001

(54) METHOD AND SYSTEM FOR VEHICLE DIRECTIONAL CONTROL BY COMMANDING LATERAL ACCELERATION

(75) Inventors: Make McDermott, Jr.; Andrew Kenny, both of College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 09/313,935

(22) Filed: May 18, 1999

Related U.S. Application Data
(60) Provisional application No. 60/086,039, filed on May 19, 1998.

(51) Int. Cl.$^7$ .................................................. B62D 6/00
(52) U.S. Cl. ............................................. 701/41; 701/42
(58) Field of Search ....................... 701/41, 42; 180/443, 180/333

(56) References Cited

U.S. PATENT DOCUMENTS

| | | | |
|---|---|---|---|
| 3,022,850 | * 2/1962 | Bidwell et al. ...................... | 180/333 |
| 4,476,954 | * 10/1984 | Johnson et al. ...................... | 180/333 |
| 4,722,416 | * 2/1988 | Ahnafield ............................ | 180/333 |
| 5,086,870 | * 2/1992 | Bolduc ................................ | 180/333 |
| 5,694,319 | * 12/1997 | Suissa et al. .......................... | 701/41 |
| 5,964,814 | * 10/1999 | Muller et al. ......................... | 701/41 |
| 6,167,981 | * 1/2001 | Boehringer et al. ................. | 180/333 |

FOREIGN PATENT DOCUMENTS

4404594 * 8/1995 (DE) .

OTHER PUBLICATIONS

Scott, J.Z., "A Testbed for Vehicular Control Systems," Master's Thesis, Texas A&M University, 1983.

Ozguner, U. and Hatipoglu, U., "An Analytical Study of Vehicle Steering Control," Fourth IEEE Conference on Control Applications, 1995.

Bundorf, R.T., and Leffer, R.L., "The Cornering Compliance Concept for the Description of Directional Control Properties." SAE Paper No. 760713, 1976.

Bundorf, R.T., "A Primer on Vehicle Directional Control," General Motors Engineering Staff Report A–2730, General Motors Technical Center, Warren, Michigan 48090, undated.

Cardew, K.H.F.; "The Automatic Steering of Vehicles—an Experimental System Fitted to a DS 19 Citroen Car," Road Research Laboratory, Ministry of Trnasport, RRL Report LR 340, Crowthorne, Berkshire, 1970.

* cited by examiner

Primary Examiner—Michael J. Zanelli
(74) Attorney, Agent, or Firm—Baker Botts L.L.P.

(57) ABSTRACT

A directional control system for a vehicle includes a driver input device operable to receive a driver input corresponding to a desired lateral acceleration of the vehicle. The system also includes a controller in communication with the driver input device, the controller being operable to generate a control signal in response to comparing the received desired lateral acceleration and an actual lateral acceleration of the vehicle. The system further includes an actuator in communication with the controller, the actuator being operable to effect a change in the direction of travel of the vehicle in response to the control signal.

26 Claims, 5 Drawing Sheets

METHOD AND SYSTEM FOR VEHICLE DIRECTIONAL CONTROL BY COMMANDING LATERAL ACCELERATION

RELATED APPLICATIONS

This application claims the benefit of U.S. Provisional Application Ser. No. 60/086,039, filed May 19, 1998.

TECHNICAL FIELD OF THE INVENTION

The present invention relates to steering control systems, and in particular to a method and system for vehicle directional control by commanding lateral acceleration.

BACKGROUND OF THE INVENTION

A number of efforts have been made to develop servo steering mechanisms associated with a joystick servo steering concept. A steering system was developed in the late nineteen-sixties that could make a vehicle automatically follow an antenna cable buried in the road. This system used an electronic proportional and derivative controller which regulated a hydraulic steering valve to turn the front wheels. A joystick steering system for a van was later developed that used a computer to automatically decrease the steering gain in proportion to the square of the vehicle speed in order to make the van safe to drive at higher speeds. The system was reported to be acceptable for use with test drivers. Recently, hydraulically powered joystick systems have been designed specifically for handicapped drivers. One joystick steering system (now marketed as the EMC Digidrive) uses an electric stepper motor to turn the steering wheel instead of regulating a power steering hydraulic valve. This system has a joystick input that decreases gain sensitivity with speed and steering wheel angle. All of these systems faced the common problem of having to compensate for steering gain when a vehicle travels at high speeds. These systems also involve a driver directly commanding the front wheel turn angle using a joystick.

SUMMARY OF THE INVENTION

Accordingly, a need has arisen in the art for a method and system for vehicle directional control by commanding lateral acceleration. The present invention provides a method and system for vehicle directional control by commanding lateral acceleration that substantially reduces problems associated with prior systems and methods.

In one embodiment of the described invention, a directional control system for a vehicle is disclosed that includes a driver input device being operable to receive a driver input corresponding to a desired lateral acceleration of the vehicle. The system also includes a controller in communication with the driver input device, the controller being operable to generate a control signal in response to comparing the received desired lateral acceleration and an actual lateral acceleration of the vehicle. The system further includes an actuator in communication with the controller, the actuator being operable to effect a change in the direction of travel of the vehicle in response to the control signal.

In another embodiment of the present invention, a system includes a driver input device that is operable to generate a first signal indicative of a desired lateral acceleration of an automobile and an accelerometer that is operable to generate a second signal indicative of an actual lateral acceleration of the automobile. The system further includes a tachometer being operable to generate a third signal indicative of a rate of change in the actual lateral acceleration of the automobile. The system also includes a controller in communication with the driver input device, the accelerometer, and the tachometer, the controller being operable to generate a drive current in response to comparing the first signal and the second signal and further in response to the third signal. The system also includes an actuator in communication with the controller and the tachometer, the actuator being operable to adjust the orientation of at least one wheel of the automobile in response to the drive current.

Embodiments of the described invention offer one or more of the following advantages. A technical advantage is to provide a steering control that can be used by handicapped drivers. A further advantage is to provide control of both acceleration or braking and steering using a single control input. Another advantage is to allow a driver who has limited hand or arm function to operate the primary control (steering, acceleration, and braking) of a vehicle with one hand, for example, leaving the other hand free for secondary controls. As yet a further advantage, at least one embodiment of the present invention enables the elimination of a hard steering column directly in front of the driver's chest. Utilizing lateral acceleration may also alleviate difficulties in compensating for high vehicle speed while controlling a vehicle's direction. Additionally, embodiments of the present invention avoid the gain compensation problems of present systems when a vehicle is traveling at high speeds.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE INVENTION

Embodiments of the present invention are illustrated in FIGS. 1–7, like numerals being used to refer to like and corresponding parts of the various drawings.

Figure 1:
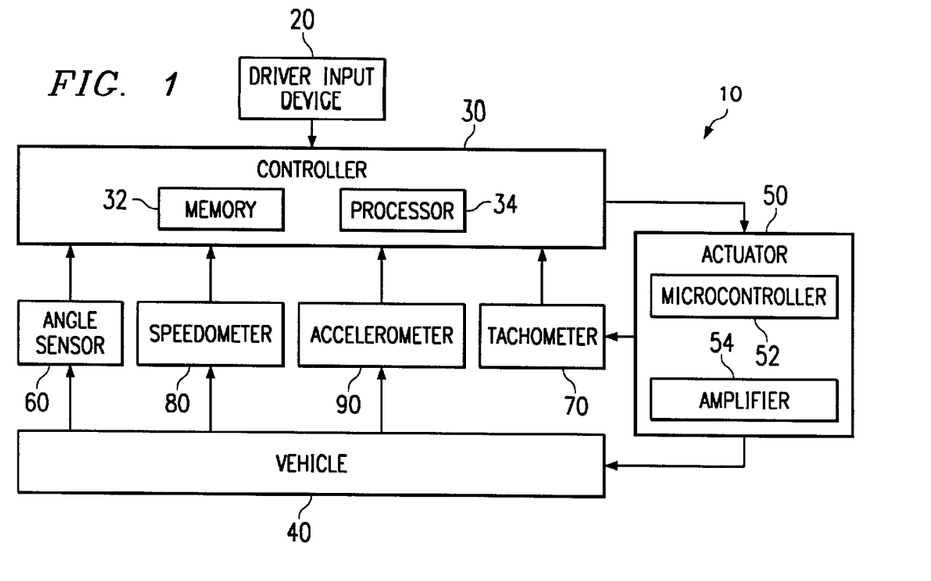
FIG. 1 is a block diagram of a directional control system in accordance with the present invention.

FIG. 1 illustrates a directional control system 10 that is implemented according to the present invention. Directional control system 10 controls steering of a vehicle 40, such as, for example, an automobile. Directional control system 10 uses lateral acceleration feedback to steer vehicle 40, by adjusting the vehicle's actual lateral acceleration to track an indicated desired lateral acceleration. Thus, directional control system 10 allows a driver to specify only lateral acceleration and avoid having to manually adjust the vehicle's steering angle and compensate for the effects of changes in speed.

Directional control system 10 includes a driver input device 20 to allow a driver to specify a desired lateral acceleration for vehicle 40. Directional control system 10 also includes an actuator 50, an angle sensor 60, a tachometer 70, a speedometer 80 and an accelerometer 90. In the described embodiment, controller 30 receives inputs from driver input device 20, speedometer 80, accelerometer 90, angle sensor 60, and tachometer 70 and uses such inputs to control actuator 50. Actuator 50 receives an input from controller 30 and controls the wheel angle, and therefore steering, of vehicle 40.

In the illustrated embodiment, driver input device 20 is a joystick; however, driver input device 20 may be any mechanism capable of producing an electrical signal in response to a driver's command, movement, signal, or other indication designating a desired lateral acceleration. Other examples of driver input device 20 include a track ball, variable switch or dial, slider, graphical user interface, one or more pedals, and any other suitable device. Joystick 20 may be mounted on a console located on either side of, or in front of, the driver; however, any location, position, or orientation of driver input device 20 can be utilized that allows a driver access to its control.

Driver input device 20 can be equipped with safety or emergency switches. For example, a button may be included on top of the joystick, or at another location, such that when the button is depressed, controller 30 produces a control signal to actuator 50 and terminates a steering control program. Additionally, a power switch, or on/off switch, may be utilized to disable driver input device 20 such that any inputs from driver input device 20 are ignored by controller 30. The switches described as being on driver input device 20 may also be located separately from driver input device 20, on a nearby console, panel, or at any other suitable location.

In one embodiment, driver input device 20 is a joystick having a range of lateral motion of about forty degrees from each side to center. Such a range of lateral motion may represent an indication of desired lateral acceleration from zero to 0.6 in either lateral direction, or a desired angle of orientation of the wheels of vehicle 40 of thirty degrees from center in either direction. The joystick may have a self-centering spring that causes the joystick, and therefore lateral acceleration controlled by the joystick, to return to center orientation if it is released. The self-centering spring may also provide a tactile force resulting in lateral resistance to motion that gives the driver an indication of the joystick's position. In such an embodiment, lateral movement of the joystick may indicate desired lateral acceleration whereas forward and backward movement may indicate forward acceleration and braking, respectively.

In the described embodiment, controller 30 is a microprocessor that is preprogrammed with the necessary algorithms and instructions necessary to process vehicle indicators and driver inputs in order to control the lateral acceleration, and therefore steering, of vehicle 40; however, controller 30 may be any other computing or electronic device, whether consisting of a single integrated device or several interworking components, that is operable to calculate a control signal output to actuator 50 in response to the indicators and inputs. For example, controller 30 may be implemented using a laptop computer and a parallel port interface operable to convert signals between digital and analog formats. It can easily be seen that the algorithms and control logic necessary to perform the functions of controller 30 can easily be accomplished using a combination of hardware and/or software components.

In the illustrated embodiment, controller 30 includes memory 32 and processor 34. In such an embodiment, processor 34 executes the necessary arithmetic and logical operations required to control the lateral acceleration of vehicle 40 by using instructions encoded in memory 32 to process data received from driver input device 20, speedometer 80, accelerometer 90, angle sensor 60, and tachometer 70, all of which may be stored in memory 32. Memory 32 may store one or more files, data structures, lists, or other arrangements of information stored in one or more components of random access memory, read only memory, magnetic computer disks, CD-ROMs, other magnetic or optical storage media, or any other volatile or non-volatile memory components. Instructions may be coded in $C^{++}$, JAVA, or any other suitable development language.

In the illustrated embodiment, actuator 50 is a brush type DC servomotor in combination with a sprocket and belt assembly coupling the servomotor to the steering column of a vehicle; however, actuator 50 may instead include or incorporate pulleys, belts, electric stepping motors, hydraulic valves, gears, or any other means of manipulating the direction of vehicle 40 or the angle of orientation of the wheels of vehicle 40 in response to a control signal from controller 30.

In one embodiment, actuator 50 may include an integrated circuit microcontroller 52 to facilitate control of motor functions. Microcontroller 52 may also be equipped with an internal tachometer. Such a built in tachometer may eliminate the need for a separate component to be used as tachometer 70. Actuator 50 may also include an amplifier 54 used to drive actuator 50. For example, a pulse-width modulation (PAM) type power amplifier may be utilized to maintain a smooth, continuous current to drive actuator 50. Sensor and signaling wires used to connect or allow communication between the components of directional control system 10 should be protected with properly grounded shielding for optimal performance.

Power for actuator 50 can be provided by a single battery of the vehicle 40, together with means to step up the voltage from, for example, 12 volts DC to a 120 volts AC. A power inverter can be utilized to achieve the desired effect.

Tachometer 70 is a tachometer or a measurement device that is capable of providing feedback in response to the angular speed at which the steering angle of the vehicle is changing. Tachometer 70 may be either separate or integral to actuator 50. In one embodiment, tachometer 70 may be coupled to the shaft of a servomotor functioning as actuator 50. In such an embodiment, tachometer 70 measures the rotational speed of the servomotor. As the servomotor directly commands the steering changing angle through a gear assembly or other mechanism, a measurement of the angular speed of the servomotor corresponds, and can be integrated to obtain, a value proportional to the steering wheel angle. The steering wheel angle also corresponds to the angle of the wheels of vehicle 40. In such an embodiment, feedback provided by tachometer 70 is useful for providing accurate feedback to controller 30 in order to closely control a lateral acceleration rate of vehicle 40. Additionally, such an embodiment provides a virtually noise-free signal.

Speedometer 80 is a sensor capable of presenting an electrical signal that is representative of the speed of vehicle 40. In one embodiment, a pulse generator may be geared to the drive axle. In such an embodiment, an integrated circuit or other component can be used to convert the frequency of a pulse signal to a voltage. Thus, a DC voltage can be generated in response to pulses and calibrated to the speed of vehicle 40. It should be noted that at slow speeds the amplitude of a signal such as that generated by a pulse generator may be difficult to discern from the amplitude of electrical noise. Thus, proper grounding of shielding covering a wire from speedometer 80 to controller 30 may improve the accuracy of speed sensing.

In the illustrated embodiment, accelerometer 90 is a capacitive sensor such as the device ADXLO5 that is made by Analog Devices; however, any sensor capable of detecting lateral acceleration of vehicle 40 can be utilized. Many devices capable of being utilized as accelerometer 90 are currently mass produced for automobile airbags. Accelerometer 90 may be mounted in vehicle 40 at the vehicle's center of gravity. For better operation, accelerometer 90 may be mounted in such a manner as to minimize high frequency vibrations from the engine and the road using a filter. For example, a 20 Hz signal pole low pass filter may be utilized to reduce some of the road noise and disturbances. Additionally, mounting the accelerometer 90 with a simple mechanical filter such as Velcro can significantly reduce undesirable vibrations.

Angle sensor 60 is a detection device capable of detecting changes in the steering of vehicle 40. Angle sensor 60 detects, for example, changes in the angle of the wheels of vehicle 40 relative to a reference point on vehicle 40. In one embodiment, angle sensor 60 includes a ten turn potentiometer geared to a steering wheel shaft that is used to indicate the steering wheel angle. A gear on the steering wheel shaft mat turn the potentiometer a predetermined interval for each turn of the steering wheel. In one embodiment, angle sensor 60 is used by directional control system 10 at low speeds when the direction of vehicle 40 is being controlled using driver input device 20, or other driver input device, to directly indicate a desired angle of orientation of the wheels of vehicle 40 for steering vehicle 40.

Thus, the components of directional control system 10 control vehicle steering using lateral acceleration feedback. Controller 30 receives signals indicative of vehicle conditions and driver inputs in order to derive a control signal that is operable to effect a desired lateral acceleration of vehicle 40. An embodiment of actuator 50 of vehicle control system 10 is described in reference to FIG. 2. One embodiment of a method used by directional control system 10 for deriving the control signal to actuator 50 is described in FIG. 3.

Figure 2:
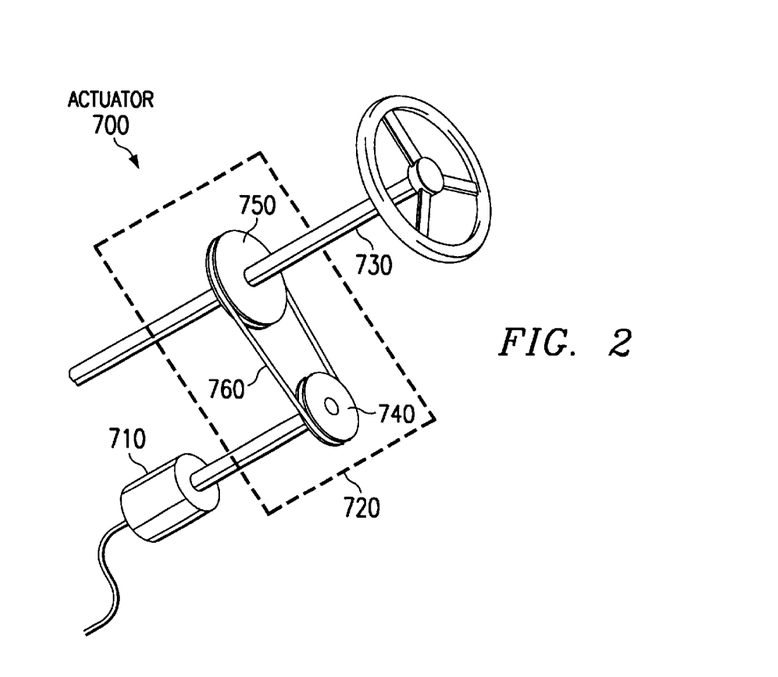
FIG. 2 is an illustration of one embodiment of an actuator used in the directional control system of FIG. 1.

FIG. 2 illustrates actuator 700 as one embodiment of actuator 50 implemented according to the teachings of the present invention. The actuator includes a motor 710 coupled to a pulley assembly 720. Pulley assembly 720 is further coupled to a steering column 730. Pulley assembly 720 includes a first pulley 740 coupled to motor 710, a second pulley 750 coupled to steering column 730, and a belt 760 that is engageable to rotate second pulley 750 in response to the rotation of first pulley 740. The embodiment described in FIG. 2 is but one example of an actuator that may be utilized to implement steering control as taught by the present invention. For example, an actuator may not involve a motor such as motor 710 or a steering column such as steering column 730, but may instead involve hydraulic valves directly coupled to or otherwise operable to change the direction of the wheels of a vehicle.

In yet another embodiment of the present invention that is not illustrated, a pulley assembly may be provided on the steering shaft of a vehicle that allows the steering wheel to remain in its conventional position so that the vehicle can be used with or without a joystick or servo steering controller. In one embodiment of the present invention, the steering shaft may been extended to accommodate the pulley which is just behind the steering wheel. The torsion may be transmitted from the extension to the steering shaft by hardened steel pins that are parallel to the shaft. Torque may be transmitted from the pulley to the extension by a straight key.

Figure 3A:
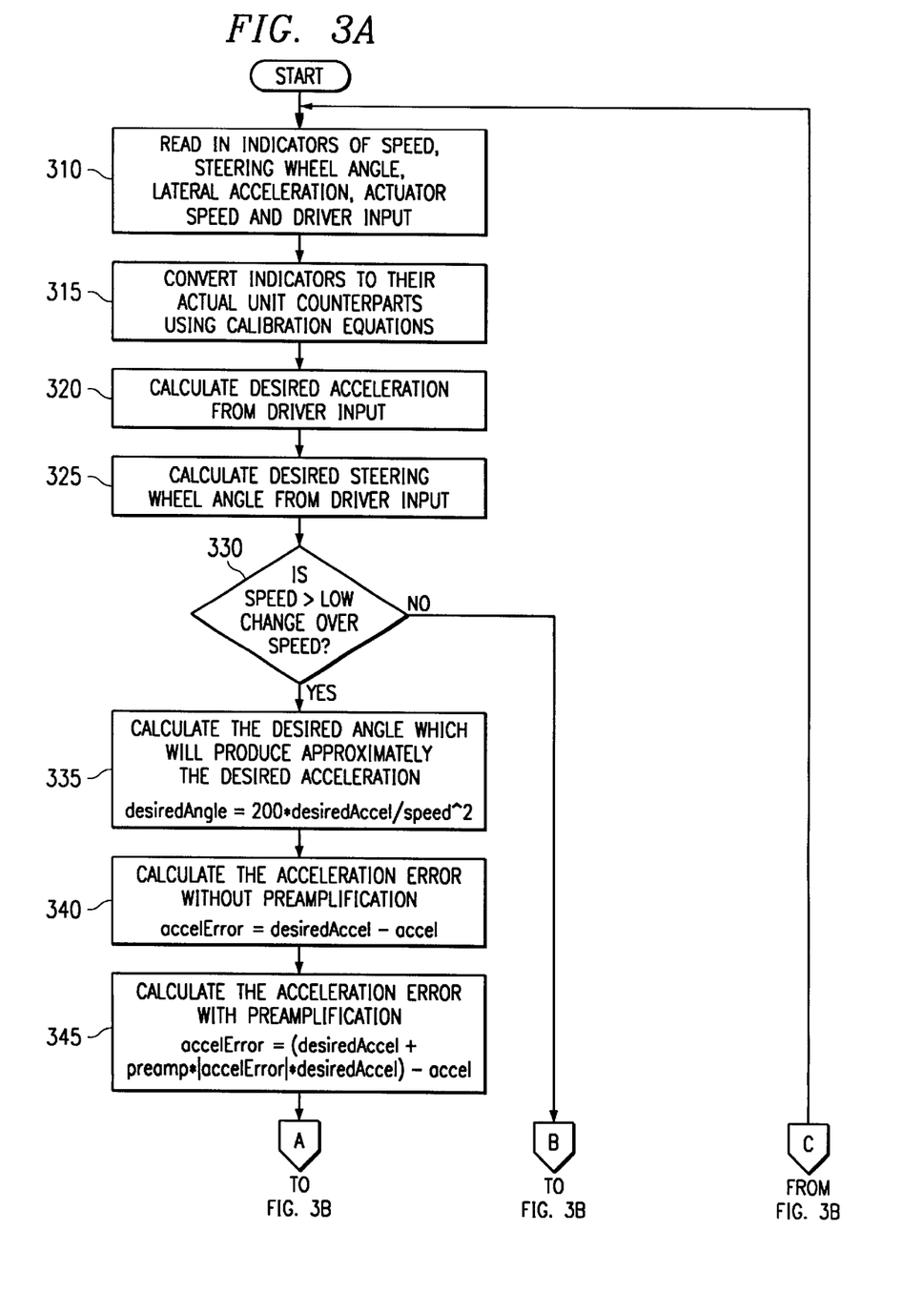
FIG. 3A is a portion of a flowchart of a steering control method according to the present invention.
Figure 3B:
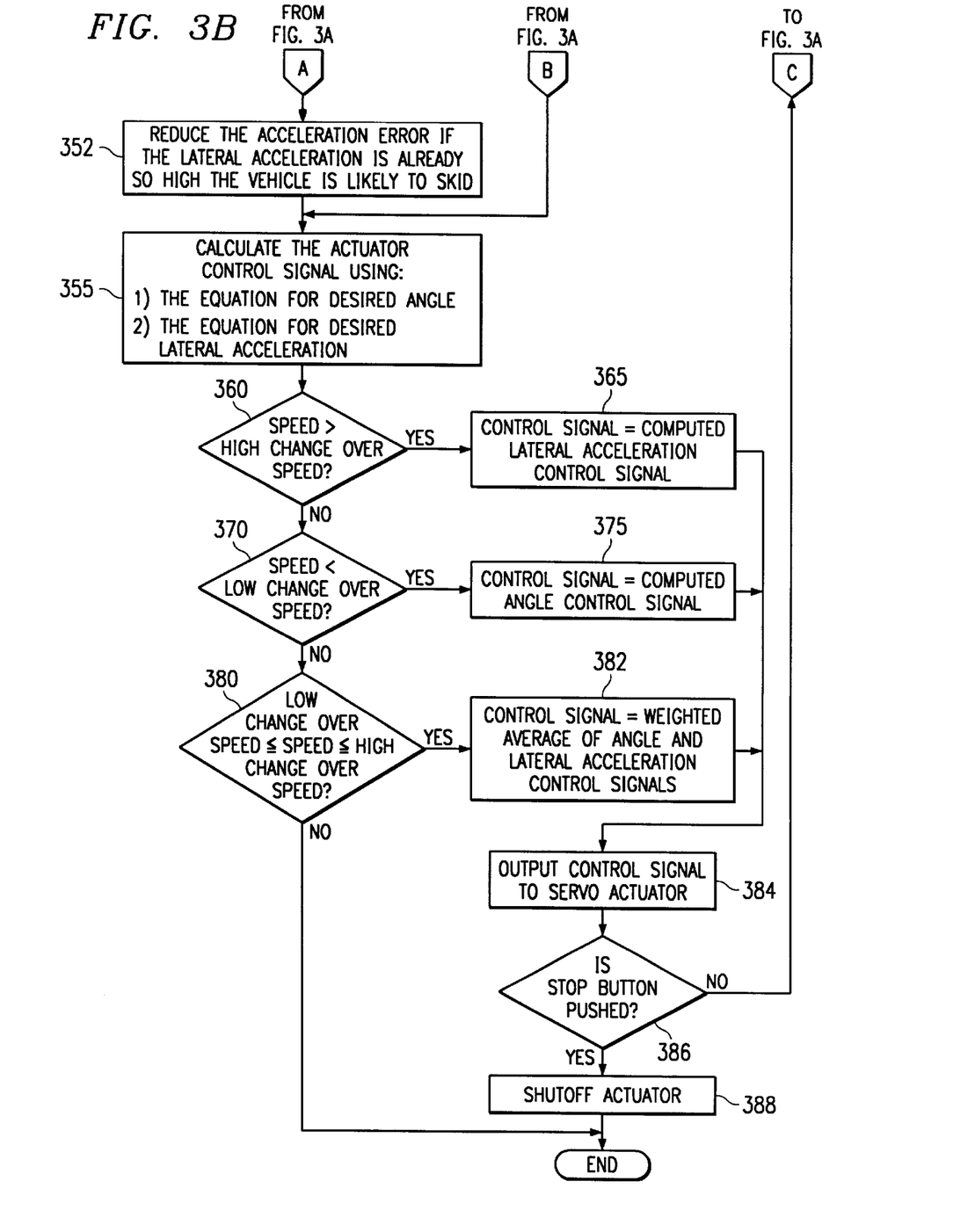
FIG. 3B is a further portion of a flowchart of a steering control method according to the present invention.

FIGS. 3A–B illustrate a method for controlling the direction of the vehicle according to the present invention. In step 310, indicators of vehicle speed, steering wheel angle, lateral acceleration of the vehicle, a driver input, and angle speed of actuator 50 are received. In step 315, such received indicators are converted to actual unit counterparts using calibration equations. Thus, for example, a digital signal representing vehicle speed may be converted into an actual speed unit that can be utilized to derive a control signal to control the lateral acceleration of vehicle 40. In step 320, the desired lateral acceleration of vehicle 40 is calculated from the driver input. In step 325, a desired steering angle or angle of orientation is calculated from the driver input.

Next, one or more control signals are derived depending upon the speed of vehicle 40. In step 330, vehicle speed is compared to a low changeover speed. The low changeover speed is a threshold speed wherein, at speeds below such low changeover speed, vehicle steering can be accomplished with less error—and more driver comfort—using calculations to derive an angle of orientation control signal for steering the vehicle based on the desired steering wheel angle. This speed may vary from vehicle to vehicle or even from driver to driver. For example, in one embodiment twelve miles per hour was selected as the low changeover speed. If the speed is greater than the low changeover speed, a desired angle is calculated in step 335 based on the desired acceleration indicated by the driver input.

In step 340, the acceleration error is calculated without preamplification. More specifically, the acceleration error equals the desired lateral acceleration minus the vehicle's current lateral acceleration. In step 345, the acceleration error with preamplification is calculated. To calculate the acceleration error with preamplification, the product of the preamplification, the absolute value of the acceleration error, and the desired acceleration is added to the desired acceleration itself. The resultant sum is then subtracted from the actual lateral acceleration of the vehicle. In practice, the desired lateral acceleration may be preamplified by a constant multiple to ensure a quick response by directional control system 10 to a driver input. The preamplification also reduces the significance of any noise associated with measurement of actual lateral acceleration in calculating steering control signals. Preamplification introduces little to no error into control calculations as a driver input other than zero desired acceleration is normally of short duration. For example, a driver moving a joystick to the right will have a desired lateral acceleration signal generated that is preamplified resulting in increased responsiveness. Once the desired lateral acceleration and direction is achieved the joystick will be returned to a central lateral position.

In step 350, the acceleration error without preamplification is reduced if the lateral acceleration of the vehicle is already so high that the vehicle is likely to skid. This skidding threshold occurs as the lateral acceleration of the vehicle passes above the threshold of 6.5 meters per second per second.

If the current vehicle speed is less than the lower changeover speed, steps 335–350 are not conducted. In either case, in step 355, two alternative actuator control signals are calculated using the equation for desired angle and the following equations for desired lateral acceleration. Thus, a lateral acceleration control signal is generated using the following equation (L):

$$i_{96}H = K_p \cdot (a_d - a_a) - K_d \cdot d(a_a)/dt$$

where $i_{96}$ H=servomotor current, $a_d$=desired angle of orientation of the wheels of the vehicle, $a_a$=actual angle of orientation of the wheels of the vehicle, $K_p$=proportional gain, and $K_d$=damping gain.

Similarly, an angle of orientation control signal is generated using the following equation (A):

$$i_r L = K\rho \cdot (an_d - an_a) - Kd \cdot d(a_a)/dt$$

where $i_{96}$ L=servomotor current, $an_d$=desired lateral acceleration, $an_a$=actual lateral acceleration, $K\rho$=proportional gain, and $Kd$=damping gain.

Next, in step 360, a determination is made as to whether the current vehicle speed is greater than a high changeover speed. As with the low changeover speed, this speed may vary from vehicle to vehicle. For example, in one embodiment, twenty miles per hour was selected. This high changeover speed designates a threshold such that when vehicle speed is higher than the high changeover speed a lateral acceleration control signal is calculated based on desired lateral acceleration and is used to drive actuator 50. Thus, if vehicle speed is greater than the high changeover speed, the control signal is set as the lateral acceleration control signal that was calculated in step 355.

If the current vehicle speed is not greater than the high changeover speed, it is determined whether the current vehicle speed is lower than the low changeover speed in step 370. If the current vehicle speed is less than the low changeover speed, the control signal for actuator 50 is set equal to the angle of orientation control signal also calculated in step 355.

If the current vehicle speed is not less than the low changeover speed, it is determined whether or not the current vehicle speed is between the low changeover speed and the high changeover speed in step 380. If the current vehicle speed is between the low changeover speed and the high changeover speed, the control signal for actuator 50 is set equal to the weighted average of the angle of orientation and lateral acceleration control signals calculated in step 355. Such a weighted average may be determined by using the following equation (M):

$$i_r = i_r H \cdot X_H + i_r L \cdot X_L$$

where $i_r$=control signal sent to the actuator, $i_r$H=control signal calculated by equation L, $i_r$L=control signal calculated by equation A, XH=(mph−mphL)/(mphH−mphL), XL=(mph H−mph)/(mphH−mphL), mph=vehicle speed, mphH=speed above high changeover speed, and mphL=speed below low changeover speed.

In step 384, the control signal determined in steps 365, 375, or 382 is supplied to actuator 50. In step 386, controller 30 determines whether or not the driver has pressed a stop button indicating a desire to terminate the control program. If the driver has not indicated a desire to stop the control program, the process again reads in sensor values as described in steps 310 and repeats the procedures described in steps 315–384. If it is determined in step 386 that the stop button was pushed by the driver, the actuator is disabled, thereby preventing any further directional control by controller 30.

As described, in one embodiment of the present invention, at very low speeds, driver input device 20 indicates steering wheel angle to allow full maneuverability for parking lot type situations. In this embodiment, at greater speeds a controller that commands lateral acceleration is used. A sliding gain prefilter may also be provided to overcome noise on the accelerometer signal and improve the lateral acceleration tracking. Transition between steering wheel angle control and lateral acceleration control occurs smoothly between software selectable upper and lower changeover speed boundaries.

FIGS. 1–3 describe various embodiments of the components and methods utilized in order to allow directional control system 10 to steer a vehicle, such as an automobile, using lateral acceleration feedback. The following FIGS. 4–7 illustrate the derivation and assumptions utilized to implement and generate such components and methods.

Derivation of Equations

Figure 4:
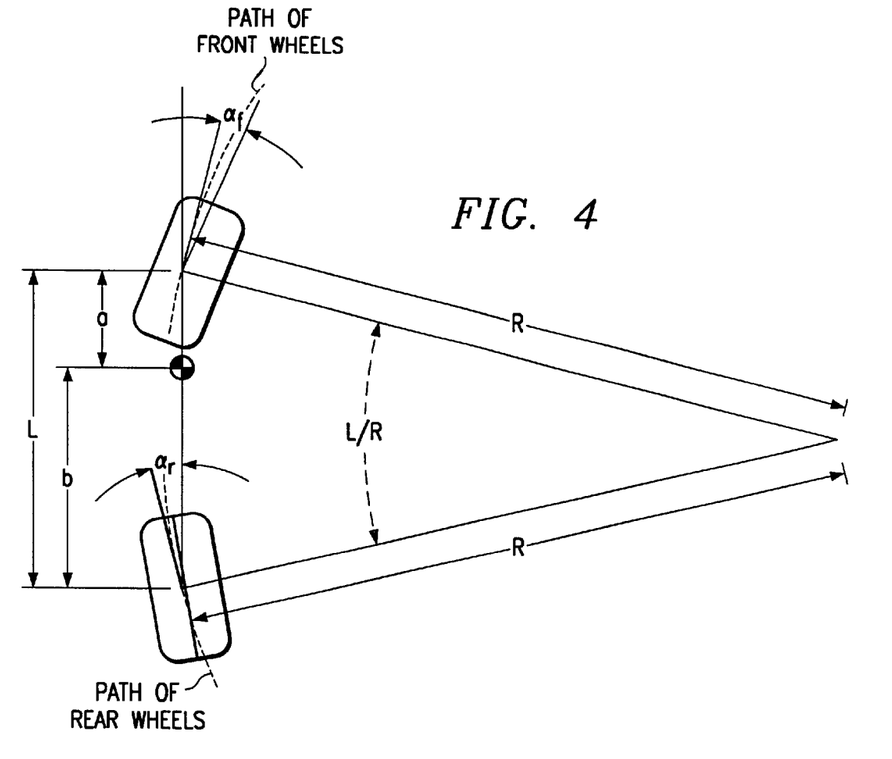
FIG. 4 is a schematic diagram illustrating the geometric wheel relationship in accordance with the present invention.

FIG. 4 illustrates relevant angles used to define equations modeling a vehicle according to an embodiment of the present invention wherein a servomotor is used as a actuator 50 and a joystick is used as driver input device 20. As described above, in one embodiment of the present invention, a joystick steering controller is used to steer a vehicle. The joystick steering controller may be otherwise suitably substituted without departing from the scope of the present invention. It is not possible to use the same steering control scheme with a joystick as with a steering wheel where the turn angle of the front tires is directly proportional to the input motion from the driver. To explain why the above statement is true, consider that the range of motion for a joystick is typically plus or minus 40°, and a typical range of the front tire angle is plus or minus 30°. For a linear system where full lock at the front tires corresponds to full travel of the joystick the two angles will be related by Equation (4-1).

$$\delta = K_{w/js} \delta_{js} \qquad (4\text{-}1)$$

where

δ=tire angle $K_{w/js}$=linear proportionality constant $\delta_{js}$=joystick angle The gain, $K_{w/js}$, is prescribed as $K_{w/js} = \delta_{max}/\delta_{js\ max} = 30/40° = \frac{3}{4}$. This is an acceptable system gain for low speed operation.

However, this gain is too high for fast vehicle speeds. If the angle of the front tires is always maintained directly proportional to the joystick angle, then a four degree movement of the joystick will turn the tires three degrees. As a first approximation the lateral acceleration due to the tire angle is proportional to the square of the forward speed. The lateral acceleration caused by a given tire angle at sixty-five miles per hour is over one hundred and fifty times higher than the lateral acceleration caused by the same tire angle at five miles per hour. For the constant gain system described above, at sixty-five miles per hour a sideways movement of the joystick of less than four degrees would cause the vehicle to turn so hard it would start to skid. Movements of less than two degrees would be required for normal driving at highway speeds. Such precise movements of a joystick would be difficult for an ordinary driver, and over control would lead to loss of control.

A simplified analysis based on an appropriate model is presented to provide insight into what physical phenomena dominate the system. This in turn, helps promote understanding of the joystick steering system. Specifically, the controller structure and the actuators and sensors needed to implement the joystick steering system become evident from this procedure.

The steady state model presented here employs several simplifying assumptions. One is that the turn radius is much greater than the vehicle wheel base. In such a turn the front tires turn only through a small angle, and this is used to simplify several of the geometric relationships. Linear constitutive properties for the tires are assumed in the analysis.

The angle that the front tires turn is called the (tire) steer angle and denoted by $\delta$. The steer angle is typically about one fifteenth of the steering wheel angle, $\delta_{SW}$ for vehicles with power steering. The relationship is $\delta = \delta_{SW}/G$, where G is the steering ratio. The steering ratio, G, is also the gain of the vehicle's steering system. From the geometrical relationships shown in FIG. 4, it follows that the steer angle is given by Equation (4-2) for a steady state turn. Because of the tire slip angle, which will be explained shortly, the path that the $$\delta = \frac{L}{R} + a_f - a_r \qquad (4\text{-}2)$$

vehicle follows is not precisely the same as the path indicated by the steer angle. The Ackerman angle, L/R indicates the steer angle required to follow a path of radius R if there were no slip.
where
$\delta$=(tire) steer angle,
$\alpha_f$=front tire slip angle,
$\alpha_r$=rear tire slip angle,
L=wheel base,
R=turn radius, and
L/r=Ackerman angle.

The road exerts a lateral force on each tire to make the vehicle turn. This force is the result of the slip angle which is the angle between the tire's direction of motion and the tire center plane. The most common tire model states that side force is proportional to the slip angle as shown by Equation (4-3). The ratio between the side force and the slip angle is the tire cornering stiffness, $C_a$.

$$F_{yf} = C_{af}\alpha_f \qquad (4\text{-}3a)$$

$$F_{yr} = C_{ar}\alpha_r \qquad (4\text{-}3b)$$

where
$C_\alpha$=tire cornering stiffness,
$\alpha$=slip angle,
F=lateral force, and
subscripts f and r refer to front and rear.

The total lateral force on the vehicle and resulting lateral acceleration is given by Equation (4-4).

$$\Sigma F_y = 2F_{yf} + 2F_{yr} = m \cdot a_y \qquad (4\text{-}4)$$

where
$F_f$=force exerted by one front tire,
$F_r$=force exerted by one rear tire,
m=vehicle mass, and
$a_y$=lateral acceleration.

The lateral forces on the front tires are generally different from the lateral forces on the rear tires. For a steady state turn, where the vehicle angular acceleration is zero, the front and rear tire forces are related by the moment equation, Equation (4-5).

$$\Sigma M_{cm} = 2F_{yf}a - 2F_{yr}b = 0 \qquad (4\text{-}5)$$

where
$M_{cm}$=the moment about the vehicle center of mass applied by the lateral forces,
a=distance from the center of mass to the front axle (see FIG. 4), and
b=distance from the center of mass to the rear axle (see FIG. 4).

The five equations (4-2), (4-3A), (4-3B), (4-4), and (4-5) can be algebraically manipulated to eliminate $\alpha_f$, $\alpha_r$, $F_{yf}$, and $F_{yr}$. The result is an expression (4-6) for the steer angle, $\delta$, that is utilized to achieve a desired lateral acceleration a. along with a path of radius R.

$$\delta = L/R + [(m_f g/2C_{af}) - (m_r g/2C_{ar})](a_y/g) \qquad (4\text{-}6)$$

$$\delta = L/R + K(a_y/g)$$

where
L=(a+b), the wheelbase,
$m_f$=(b/L)·m, the mass fraction accelerated by the front tires,
$m_r$=(a/L)·m, the mass fraction accelerated by the rear tires,
L/R=Ackerman steer angle for a path of radius R, and
K=$(m_f g/2C_{af}) - (m_r g/2C_{ar})$, the understeer gradient.

The lateral acceleration $a_y$ is the centripetal acceleration and is given by Equation (4–7).

$$a_y = \frac{U^2}{R} \qquad (4\text{-}7)$$

where
U=forward speed, and
R=radius of vehicle path.

Finally, Equations (4-6) and (4-7) can be combined to obtain an expression for the ratio of the lateral acceleration, $a_y$, to steering angle, $\delta$. This ratio is called the lateral acceleration gain and is given by Equation (4-8).

$$\frac{a_y/g}{\delta} = \frac{U^2/Lg}{1 + [(m_f g/2C_{af}) - (m_r g/2C_{ar})](U^2/Lg)} \qquad (4\text{-}8)$$

The only operational variable involved in the lateral acceleration gain is the vehicle speed, U; the lateral acceleration gain is independent of the radius of path, R.

This analysis of the vehicle in a steady state turn shows that the lateral acceleration is proportional to the tire turn angle and to the square of the forward speed. The lateral acceleration gain as a function of forward speed can be approximated using approximate values for tire stiffness. As speed increases the steering angle needed to achieve a given lateral acceleration decreases rapidly; i.e., the vehicle becomes very sensitive to steering inputs at high speed. A steering controller that allows a driver to directly command lateral acceleration relieves the driver from having to adjust for the effect of changes in speed. In particular, it may be desirable to make the lateral acceleration gain a constant; i.e., to remove the quadratic increase in gain with increasing speed.

Although in theory Equation (4-8) could be used to convert a desired (driver commanded) lateral acceleration into a steer angle, in practice this is not a good idea. There are several reasons. The assumptions made to linearize and simplify the steady state model reduce its accuracy. The actual lateral acceleration response to a change in steering wheel angle is governed by nonlinear differential equations of motion with uncertain parameters and structure. For these reasons, according to the teachings of the present invention, for an actual steering control system, acceleration feedback is needed to make the vehicle's actual lateral acceleration track the commanded lateral acceleration.

Figure 5:
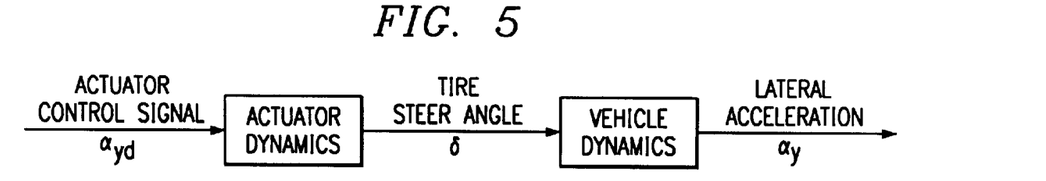
FIG. 5 is a block diagram incorporating an actuator of lateral acceleration, an associated plant, and vehicle lateral dynamics in accordance with the present invention.

FIG. 5 illustrates a transfer model that can be utilized by a computer or microcontroller to determine the necessary actuator control signal to command a particular lateral acceleration in accordance with the present invention. A dynamic vehicle model is presented that is capable of showing the transient response of the vehicle lateral acceleration caused by changing the tire angle. Equation (5-1) is the model transfer function. The parameters in this equation are only known with some uncertainty. The mass properties (m, a, b, 1) change with vehicle loading and the tire cornering stiffness changes with loading, tire pressure, road conditions, operating conditions, etc. The coefficients of the transfer function are also dependent on the forward speed.

$$\frac{a_y}{\delta} = \frac{(N1 \cdot s^2 + N2 \cdot s + N3)}{D1 \cdot s^2 + D2 \cdot s + D3} U \qquad (5\text{-}1)$$

where $$N1 = 2IC_{\alpha f}$$

$$N2 = 2aC_{\alpha f}mU + 2C_{\alpha f}\left(\frac{2a^2C_{\alpha f} + 2b^2C_{\alpha f}}{U}\right) -$$
$$2ac_{\alpha f}\left(mU + \frac{2aC_{\alpha f} - 2bC_{\alpha r}}{U}\right)$$

$$N3 = 2aC_{\alpha f}(2C_{\alpha f} + 2C_{\alpha r}) - 2C_{\alpha f}(2aC_{\alpha f} - 2bC_{\alpha r})$$

$$D1 = I \cdot m \cdot U$$

$$D2 = I(2C_{\alpha f} + 2C_{\alpha r}) + m(2a^2C_{\alpha f} + 2b^2C_{\alpha r})$$

$$D3 = \left(\frac{2a^2C_{\alpha f} + 2b^2C_{\alpha r}}{U}\right)(2C_{\alpha f} + 2C_{\alpha r}) -$$
$$\left(mU + \frac{2aC_{\alpha f} - 2bC_{\alpha r}}{U}\right)(2aC_{\alpha f} - 2bC_{\alpha r})$$

$a_y$ = lateral acceleration $I$ = Yaw Inertia of car (about its vertical axis)

Equation (5-2) models the response of the steering linkage to the torque applied by the servomotor.

$$\delta = (T - T_{sa})/(I_{eq} \cdot s^2) = T/[(I_{am} + I_{pm} + I_{pm} + I_{ps}/srm^2) \cdot s^2] \qquad (5\text{-}2)$$

where
  T=torque of servomotor,
  $T_{sa}$=self aligning torque,
  $I_{eq}$=equivalent inertia,
  $I_{am}$=inertia of motor armature,
  $I_{pm}$=inertia of motor pulley,
  $I_{ps}$=inertia of steering wheel and pulley, and
  srm—speed reduction ratio between servomotor and steering wheel.

The value of the equivalent inertia, Ieq, is the inertia of the motor armature, the pulley on the motor shaft, and the components on the steering wheel shaft, all referred to the motor shaft. The inertia of the tires is not considered when a vehicle has power steering. For the steering wheel and steering wheel pulley inertia a conservative value of 0.0625 kg-m2 is used in the numerical simulations. This is equivalent to the inertia of a 2 kg steering wheel and a pulley with an evenly distributed mass and a 0.5 m diameter.

The speed reduction ratio is a design parameter which needs to be chosen to meet the performance specifications. Increasing the speed reduction ratio reduces the equivalent inertia seen by the motor and causes it to turn more quickly. However, increasing this ratio slows down the steering wheel speed relative to the motor speed. Therefore, there is an optimum speed reduction ratio where the lateral acceleration response time to a step input is a minimum.

The torque applied by the motor is directly proportional to the electric current driven through the armature by the motor control amplifier. Due to the motor back emf, the voltage required to drive the current though the armature increases linearly with the speed of the motor. Equations (5-3) and (5-4) model these relations with the assumption that the motor inductance is negligible. By using computer simulations, it can be determined that fifteen hundred watts are needed in order to achieve the torque necessary to turn a typical steering wheel 1.5 turns in 0.5 seconds. This turning rate is faster than a driver can turn the steering wheel and allows a safety margin for uncertainty in the calculation parameters.

$$T = K_t i \qquad (5\text{-}3)$$

$$V = iR_w + K_e \omega \qquad (5\text{-}4)$$

where
  $K_t$=motor torque constant
  $K_e$=motor speed constant
  i=motor current
  $R_w$=winding resistance
  $\omega$=motor speed
  V=back emf The vehicle dynamic model given by Equation (5-1), the steering system model given by Equation (5-2), and the servomotor model given by Equations (5-3) and (5-4) are combined to build the transfer model shown in FIG. 5. The transfer model input is the servomotor current. The motor current and, hence, the servomotor torque are limited by the demagnetization current for the motor. The final output of the transfer model is the vehicle lateral acceleration. An intermediate output is the tire angle acceleration which changes due to motor torque. The tire angle can be related to the steering wheel angle and the servomotor shaft angle by the steering ratio and the motor pulley drive reduction ratio. The first derivative of the motor shaft angle is the motor speed and the motor speed multiplied by the motor torque is the power output by the motor. A computer or controller such as controller 30 can calculate the required instantaneous motor power to achieve a desired response using this relation. The self aligning torque shown in the FIG. 5 causes the steering wheel to naturally return to center when the vehicle is in a turn.

Figure 6:
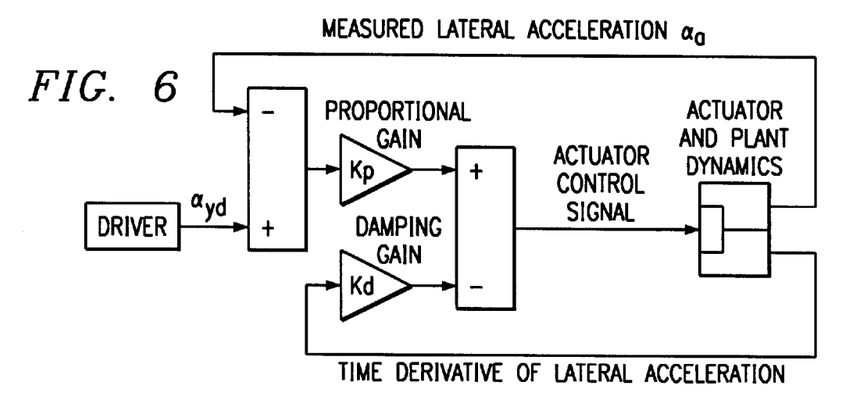
FIG. 6 is a block diagram of a feedback controller of lateral acceleration incorporating the model of FIG. in accordance with the present invention.

To observe how the steering system plant could respond to lateral acceleration commands, a closed loop feedback system should be incorporated into the model. No compensations for noise are incorporated at this point because the level of road and vehicle induced noise was still unknown. Therefore, this simulation showed lateral acceleration response under ideal conditions. The block diagram of the PD type feedback controller and plant is shown in FIG. 6. The single block labeled "actuator and plant dynamics" in FIG. 6 is the complete block diagram shown in FIG. 5. The controller gains may be initially determined analytically using the root locus method. They may then be tuned based on simulation results to account for the nonlinear demagnetization current limit. Decreased sensitivity to changes in the plant is one of the advantages of using feedback control.

At low speeds the driver commands steering wheel angle and at high speeds the driver commands lateral acceleration. To make the transition between the low and the high speed control modes smoothly, the change over takes places gradually between two speeds. At intermediate speeds the motor torque control signal is calculated by Equation (6-1). This equation is a weighted average of the torque control signals calculated by the high speed lateral acceleration controller and low speed tire angle controller.

$$ss = ssH \cdot X_H + ssL \cdot X_L \tag{6-1}$$

where
  ss=steer signal sent to servomotor amplifier to control torque,
  ssH=steer signal calculated by high speed lateral acceleration tracking controller,
  ssL=steer signal calculated by low speed tire angle tracking controller,
  XH=(mph−mphL)/(mphH−mphL),
  XL=(mph H−mph)/(mphH−mphL),
  mph=vehicle speed,
  mphH=speed above high changeover speed, and
  mphL=speed below low changeover speed.

Since in the intermediate range, the signal sent to the servomotor is a weighted average of the high and low speed controller signals, the strongest current (servomotor torque) control signal will effectively control the path of the vehicle. The servomotor control signal calculated by the lateral acceleration controller is different from the control signal calculated by the steering wheel angle position controller for a given amount of error between the driver's desired and actual vehicle path because the lateral acceleration controller must use a lower proportional gain. For the weighted average method to work smoothly, the angle position error and the lateral acceleration error must become zero simultaneously, To accomplish this, the joystick angle is translated first into the driver's desired lateral acceleration and from there into an equivalent steering wheel angle using Equation (6-2).

$$a_y = K \cdot \delta \cdot U^2 \tag{6-2}$$

where
  δ=tire steer angle
This equation is an approximation of Equation (4-8) for low speed operation, where the value of the constant, K, is determined from measurements. Calculating the desired tire angle from the desired lateral acceleration causes both angle and acceleration errors to reach zero at the same time during a turn. Because both the lateral acceleration controller and steering wheel angle controller use a desired lateral acceleration as the input beginning at the low speed of the intermediate range, the driver experiences a smooth change to lateral acceleration control beginning at the low speed.

Figure 7:
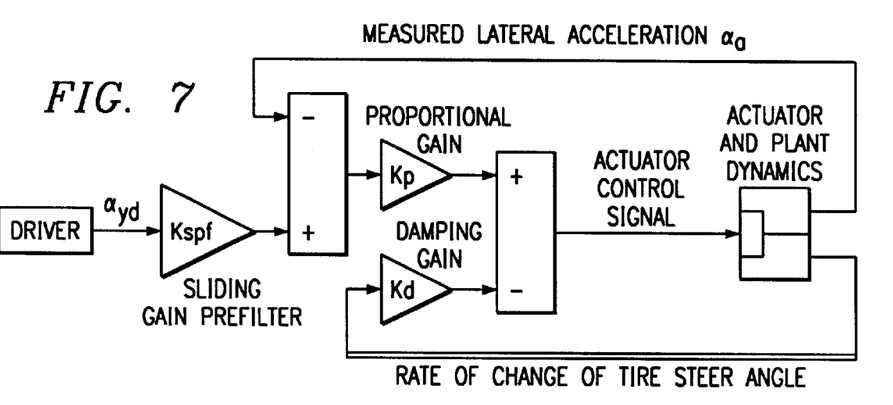
FIG. 7 is a more detailed block diagram of FIG. 5 incorporating a damping function in accordance with the present invention.

Two changes may be incorporated to the steering controller to address any noise coming from the accelerometer. First the damping feedback signal may be taken from the servomotor tach/generator, and second a sliding gain prefilter may be provided. FIG. 7 shows the new block diagram of the controller, and Equation (7-1) is the corresponding controller equation.

$$T = Kp \cdot (Kspf \cdot a_d = a_a) - kd \cdot \text{rpm} \tag{7-1}$$

where
  $a_d$=desired lateral acceleration,
  $a_a$=actual lateral acceleration,
  Kspf=sliding prefilter gain,
  Kp=proportional gain,
  Kd=damping gain,
  rpm=motor speed, and
  T=servomotor torque output.

In the classical Proportional Derivative (PD) controller used in the original vehicle steering model, the acceleration error (P) and its derivative (D) are multiplied by gains and added to construct the controller command. However, for this embodiment the derivative of lateral acceleration is not a sensed (measured) variable and the noise present in the accelerometer signal precludes using numerical methods to approximate the derivative.

Equation (5-1) indicates that ay is proportional to δ (for steady state) which suggests that the derivative of δ be used for damping feedback. As Equation (7-1) shows, the derivative damping is based on the signal from the servomotor's built in tachometer. There is very little noise on the servomotor tachometer signal so the damping gain can be high enough to make the system over damped without causing any feedback vibration. The advantage of an over damped steering system is that it does not oscillate under the drivers steering commands.

In one embodiment of the present invention, a prefilter is provided because the accelerometer noise makes it is impossible to turn up the proportional gain high enough to get the required tracking performance between the actual lateral acceleration and the desired lateral acceleration. The noisy feedback may cause the steering wheel to shake when the gain is turned up. In contrast, the prefilter amplifies only the desired acceleration signal which is nearly noiseless because it comes from a potentiometer on the joystick. Multiplying the desired acceleration by the prefilter gain increases the magnitude of the error signal and improves the tracking response between the actual and desired lateral acceleration.

A sliding gain prefilter retains most of the tracking improvement benefit of a constant gain prefilter, while allowing full angular range of the joystick. The prefilter gain is calculated using Equation (7-2). The value of the sliding prefilter gain, Kspf, is still affected by the noise on the accelerometer signal due to the difference in the desired and actual acceleration, The effect of the noise is minor, since the value of Kpf is 0.4 and the noise amplitude is only about 0.05 M/S2. Therefore, at steady state the value of Kspf is about one, even at the noise peak amplitude.

Because of the natural tendency of the steering wheel to return to center, a controller can hold the sliding prefilter gain to one when coming out of a turn, and the proportional gain of one will be high enough to cause the vehicle to quickly track the driver's desired lateral acceleration. The controller determines the vehicle is entering a turn if the absolute value of the desired acceleration is greater than the absolute value of the actual acceleration and both the desired and actual lateral accelerations have the same sign. This removes any effect of the accelerometer noise on the value of Kspf when the steering is released slowly out of a turn. It also cuts the affect of the noise in half when the vehicle is traveling straight. Equation (7-2B) shows this mathematically.

$$Kspf=1+Kpf\,|a_d-a_a| \text{ for entry into turn} \qquad (7\text{-}2a)$$

$$Kspf=1 \text{ for release turn} \qquad (7\text{-}2b)$$

where $a_d$=desired lateral acceleration, $a_a$=actual lateral acceleration, p1 Kpf=prefilter gain, and Kspf=sliding prefilter gain.

What is claimed is:

1. A directional control system for an automobile, the system comprising:
   a driver input device operable to receive a driver input corresponding to a desired lateral acceleration of the automobile;
   a controller in communication with the driver input device and the automobile, the controller operable to generate a control signal in response to comparing the received desired lateral acceleration and an indication of actual lateral acceleration of the automobile; and
   an actuator in communication with the controller, the actuator operable to effect a change in the direction of travel of the automobile in response to the control signal.

2. The directional control system of claim 1, and further comprising an accelerometer in communication with the controller, the accelerometer operable to detect the actual lateral acceleration of the automobile.

3. The directional control system of claim 1, and further comprising a speedometer in communication with the controller, the speedometer operable to detect the current speed of the automobile, and wherein the controller is further operable to generate the control signal in response to the current speed of the automobile.

4. The directional control system of claim 1, and further comprising a tachometer in communication with the controller and the actuator, and wherein the tachometer is operable to detect a speed of the actuator, the speed of the actuator being indicative of the rate of change in the actual lateral acceleration of the automobile.

5. The directional control system of claim 1, and further comprising an angle sensor in communication with the controller, the angle sensor operable to detect an angle of orientation of at least one wheel of the automobile, and wherein the controller is operable to generate the control signal further in response to the detected angle of orientation.

6. The directional control system of claim 1, wherein the actuator includes a motor, the motor operable to effect the change in the direction of travel of the automobile by engaging a sprocket and belt assembly to actuate an adjustment of the angle of orientation of at least one wheel of the automobile in response to the control signal, the control signal initiating a drive current to the motor in response to calculating the difference between the desired lateral acceleration and the actual lateral acceleration.

7. The directional control system of claim 1, wherein the controller includes a processor and a memory associated with the processor, the processor operable to generate the control signal in response to comparing the desired lateral acceleration and the actual acceleration and further in response to instructions stored in the memory.

8. The directional control system of claim 7, wherein the instructions include a computer program stored in the memory, the computer program operable to:
   calculate the desired lateral acceleration in response to the driver input; and
   determine the control signal in response to the calculated desired lateral acceleration and the actual lateral acceleration.

9. An automated method for controlling the direction of travel of a vehicle, the method comprising:
   receiving a driver input corresponding to a desired lateral acceleration of the vehicle;
   comparing, by a controller, the desired lateral acceleration to an actual lateral acceleration of the vehicle; and
   effecting a change in the direction of travel of the vehicle in response to comparing the desired lateral acceleration to the actual lateral acceleration.

10. The method of claim 9, and further comprising receiving an indicator of a rate of change in the actual lateral acceleration of the vehicle, and wherein effecting a change in the direction of travel further includes effecting a change in the direction of travel of the vehicle in response to the received rate of change.

11. The method of claim 10, wherein comparing the desired lateral acceleration to the actual lateral acceleration further includes calculating a lateral acceleration error by subtracting the actual lateral acceleration from the desired lateral acceleration.

12. The method of claim 11, wherein effecting a change in the direction of travel includes:
   calculating a first product by multiplying a proportional gain constant associated with the vehicle and the lateral acceleration error;
   calculating a second product by multiplying a damping gain constant and the rate of change in the actual lateral acceleration; and
   calculating a product difference by subtracting the second product from the first product; and
   generating a lateral acceleration control signal in response to the calculated product difference.

13. The method of claim 9, and further comprising:
   receiving a rate of change in the actual lateral acceleration of the vehicle;
   receiving an actual angle of orientation of at least one wheel of the vehicle;
   receiving a rate of change in the actual angle of orientation of the at least one wheel;
   receiving a speed of the vehicle; and
   wherein the driver input additionally corresponds to a desired angle of orientation of at least one wheel of the vehicle.

14. The method of claim 13, wherein effecting a change in the direction of travel of the vehicle at speeds greater than a high threshold speed includes:
   calculating a lateral acceleration error by subtracting the actual lateral acceleration from the desired lateral acceleration;

calculating a first product by the multiplying a proportional gain constant associated with the vehicle and the lateral acceleration error;

calculating a second product by multiplying a damping gain constant and the rate of change in the actual lateral acceleration;

calculating a first product difference by subtracting the second product from the first product; and generating a lateral acceleration control signal operable to effect a change in the direction of travel of the vehicle in response to the calculated first product difference.

15. The method of claim 14, wherein effecting a change in the direction of travel of the vehicle at speeds less than a low threshold speed includes:

calculating a angle of orientation error by subtracting the actual angle of orientation from the desired angle of orientation;

calculating a third product by the multiplying a proportional gain constant associated with the vehicle and the angle of orientation error;

calculating a fourth product by multiplying a damping gain constant associated with the vehicle and the rate of change in the actual angle of orientation;

calculating a second product difference by subtracting the fourth product from the third product; and generating an angle of orientation control signal operable to effect a change in the direction of travel of the vehicle in response to the calculated second product difference.

16. The method of claim 15, wherein effecting a change in the direction of travel of the vehicle at speeds between the low threshold speed and the high threshold speed is performed in response to a weighted average of the calculated first and second product differences and the speed of the vehicle.

17. A method for controlling the steering of an vehicle, the method comprising:

receiving a first signal indicative of a desired lateral acceleration of the vehicle and a second signal indicative of an actual lateral acceleration of the vehicle;

receiving a third signal indicative of the rate of change in the actual lateral acceleration of the vehicle;

comparing the first and second signals; and changing the orientation of at least one wheel of the vehicle in response to the comparison of the first and second signals and further in response to the third signal.

18. The method of claim 17, wherein changing the orientation of the at least one wheel includes generating a control signal to an actuator.

19. The method of claim 17, wherein changing the orientation of the at least one wheel of the vehicle further includes changing the orientation in response to an actuator.

20. The method of claim 17, and further comprising receiving a fourth signal indicative of the speed of the vehicle, wherein changing the orientation of the at least one wheel of the vehicle is further in response to the fourth signal.

21. A system, the system comprising:

a driver input device operable to generate a first signal indicative of a desired lateral acceleration of an automobile;

an accelerometer operable to generate a second signal indicative of an actual lateral acceleration of the automobile;

a tachometer operable to generate a third signal indicative of a rate of change in the actual lateral acceleration of the automobile;

a controller in communication with the driver input device, the accelerometer, and the tachometer, the controller operable to generate a control signal in response to comparing the first signal and the second signal and further in response to the third signal; and an actuator in communication with the controller and the tachometer, the actuator operable to adjust the orientation of at least one wheel of the automobile in response to the control signal.

22. The system of claim 21, wherein the driver input device is a joystick and the first signal is generated in response to lateral movement of the joystick.

23. The system of claim 21, wherein the driver input device is at least one pedal and the first signal is generated in response to force detected on the at least one pedal.

24. The system of claim 21, and further comprising a speedometer in communication with the controller, the speedometer operable to detect the speed of the automobile, and the controller further operable to generate the control signal further in response to the detected speed of the automobile.

25. The system of claim 21, and further comprising an angle sensor in communication with the controller, the angle sensor operable to generate a fourth signal indicative of the orientation of the at least one wheel, and wherein the first signal is further indicative of a desired orientation of the at least one wheel, the controller further operable to generate the control signal in response to comparing the first signal to the fourth signal.

26. The system of claim 21, and further comprising the automobile.

* * * * *

UNITED STATES PATENT AND TRADEMARK OFFICE
CERTIFICATE OF CORRECTION

PATENT NO. : 6,301,534 B1
DATED : October 9, 2001
INVENTOR(S) : Make McDermott, Jr., et al.

It is certified that error appears in the above-identified patent and that said Letters Patent is hereby corrected as shown below:

Title page,
Item [56], References Cited, OTHER PUBLICATIONS,
Line 6, after "and", delete "Leffer", and insert -- Leffert --.
Line 14, after "of", delete "Trnasport", and insert -- Transport --.

Column 4,
Line 37, after "modulation", delete "(PAM)", and insert --(PWM) --.

Column 5,
Line 59, after "FIG", delete "2", and insert -- 7 --.

Column 7,
Line 7, that portion of the formula that reads "$i_{96}$" should read -- $i_\tau$ --.
Line 7, that portion of the formula that reads "$K_d$" should read -- $Kd$ --.
Line 10, that portion of the formula that read "$i_{96}$" should read -- $i_\tau$ --.
Line 14, that portion of the formula that reads "$K_d$" should read -- $Kd$ --.
Line 23, that portion of the formula that reads "$i_{96}$" should read -- $i_\tau$ --.

Column 8,
Line 36, after "as", delete "a".

Column 9,
Line 50, delete "L/r", and insert -- L/R --.

Column 10,
Line 32, that portion of the formula that reads "$-(mrg/2C_{ar})$" should read --
$-(m_r g/2C_{ar})$ --.

Column 11,
Line 67, that portion of the formula that reads "$-(I_{am} + I_{pm} + I_{pm} + I_{pps}/srm^2)$" should read -- $-(I_{am} + I_{pm} + I_{pps}/srm^2)$.

Column 12,
Line 42, delete "$T = K_l i$" and insert -- $T = K_t i$ --.

Column 13,
Line 58, after "simultaneously", delete ",", and insert -- . --.

Column 14,
Line 47, after "it", delete "is".
Line 64, after "acceleration", delete ",", and insert -- . --.

UNITED STATES PATENT AND TRADEMARK OFFICE
CERTIFICATE OF CORRECTION

PATENT NO. : 6,301,534 B1
DATED : October 9, 2001
INVENTOR(S) : Make McDermott, Jr., et al.

It is certified that error appears in the above-identified patent and that said Letters Patent is hereby corrected as shown below:

<u>Column 15,</u>
Line 21, after "acceleration", delete "p1".
Line 21, after "p1" delete "K pf=prefilter gain, and", and insert -- Kpf=prefilter gain, and --. (Note: On the next line.)

Signed and Sealed this

Nineteenth Day of March, 2002

*Attest:*

*Attesting Officer*

JAMES E. ROGAN
*Director of the United States Patent and Trademark Office*